US011299617B2

(12) United States Patent
Prieto et al.

(10) Patent No.: US 11,299,617 B2
(45) Date of Patent: Apr. 12, 2022

(54) LOW SPEED CROSS-LINKING CATALYST FOR SILANE-GRAFTED PLASTOMERS

(71) Applicant: BOREALIS AG, Vienna (AT)

(72) Inventors: Oscar Prieto, Stenungsund (SE); Jeroen Oderkerk, Stenungsund (SE); Jari-Jussi Ruskeeniemi, Porvoo (FI); Stefan Hellström, Stenungsund (SE); Tanja Piel, Linz (AT); Daniela Mileva, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 17/276,322

(22) PCT Filed: Sep. 26, 2019

(86) PCT No.: PCT/EP2019/075979
§ 371 (c)(1),
(2) Date: Mar. 15, 2021

(87) PCT Pub. No.: WO2020/069952
PCT Pub. Date: Apr. 9, 2020

(65) Prior Publication Data
US 2021/0324189 A1 Oct. 21, 2021

(30) Foreign Application Priority Data
Oct. 2, 2018 (EP) .................... 18198382

(51) Int. Cl.
C08L 51/06 (2006.01)
C08L 23/08 (2006.01)
C08J 3/24 (2006.01)

(52) U.S. Cl.
CPC ............. C08L 51/06 (2013.01); C08J 3/248 (2013.01); C08L 23/0869 (2013.01); C08J 2351/06 (2013.01); C08J 2423/08 (2013.01); C08J 2491/06 (2013.01); C08L 2310/00 (2013.01)

(58) Field of Classification Search
CPC .................................................. C08K 5/3435
See application file for complete search history.

(56) References Cited

U.S. PATENT DOCUMENTS

| | | | |
|---|---|---|---|
| 5,756,582 A | 5/1998 | Mori | |
| 7,732,382 B2 | 6/2010 | Putzig | |
| 8,062,394 B2 | 11/2011 | Gaeta et al. | |
| 8,217,107 B2 | 7/2012 | Ramakrishnan et al. | |
| 8,476,375 B2 | 7/2013 | Backer et al. | |
| 9,284,423 B2 | 3/2016 | Brinkhuis et al. | |
| 9,637,602 B2 | 5/2017 | Potter et al. | |
| 9,670,293 B2 | 6/2017 | Reznichenko et al. | |
| 9,670,347 B2 | 6/2017 | Tölsch et al. | |
| 9,708,481 B2 | 7/2017 | Wang et al. | |
| 9,745,431 B2 | 8/2017 | Potter et al. | |
| 9,751,962 B2 | 9/2017 | Wang et al. | |
| 9,777,142 B2 | 10/2017 | Sandholzer et al. | |
| 9,802,394 B2 | 10/2017 | Cavacas et al. | |
| 9,828,698 B2 | 11/2017 | Wang et al. | |
| 9,890,275 B2 | 2/2018 | Sandholzer et al. | |
| 9,976,020 B2 | 5/2018 | Nummila-Pakarinen et al. | |
| 10,011,708 B2 | 7/2018 | Lampela et al. | |
| 10,030,109 B2 | 7/2018 | Boragno et al. | |
| 10,040,930 B2 | 8/2018 | Gloger et al. | |
| 10,100,185 B2 | 10/2018 | Wang et al. | |
| 10,100,186 B2 | 10/2018 | Wang et al. | |
| 10,227,427 B2 | 3/2019 | Reichelt et al. | |
| 10,450,451 B2 | 10/2019 | Wang et al. | |
| 10,519,259 B2 | 12/2019 | Resconi et al. | |
| 10,870,718 B2 | 12/2020 | Denifl et al. | |
| 2007/0011951 A1 | 1/2007 | Gaeta et al. | |
| 2007/0037924 A1 | 2/2007 | Talkowski | |
| 2007/0191233 A1 | 8/2007 | Putzig | |
| 2008/0242763 A1 | 10/2008 | Ramakrishnan et al. | |
| 2011/0147041 A1 | 6/2011 | Sengupta et al. | |
| 2011/0166285 A1 | 7/2011 | Zander et al. | |
| 2011/0178198 A1 | 7/2011 | Backer et al. | |
| 2014/0235785 A1 | 8/2014 | Brinkhuis et al. | |
| 2016/0185946 A1 | 6/2016 | Sandholzer et al. | |
| 2016/0194486 A1 | 7/2016 | Sandholzer et al. | |
| 2016/0200838 A1 | 7/2016 | Reznichenko et al. | |
| 2016/0208085 A1 | 7/2016 | Gloger et al. | |
| 2016/0229158 A1 | 8/2016 | Cavacas et al. | |

(Continued)

FOREIGN PATENT DOCUMENTS

| CN | 101982499 A | * | 3/2011 | ............. B29C 48/04 |
|---|---|---|---|---|
| CN | 102532664 A | | 7/2012 | |

(Continued)

OTHER PUBLICATIONS

Machine translation of CN-102719077-A (Year: 2012).*
Machine translation of CN-101982499-A (Year: 2011).*
Bauer et al., Plastics Handbook: The Resource for Plastics Engineers, 5th Edition, Carl Hanser Verlag GmbH Co. KG, pp. 337-348 (2019).
Levigoureux et al., "Catalyst alternatives to replace DBTDL and crosslink speed improvement of a low voltage cable insulation," 9th International Conference on Insulated Power Cable, Jicable '15—Versaille, Jun. 21-25, 2015 (6 pgs).
European Patent Office, International Search Report in International Application No. PCT/EP2019/075979 (dated Nov. 5, 2019).

(Continued)

Primary Examiner — Wenwen Cai
(74) Attorney, Agent, or Firm — Leydig, Voit & Mayer, Ltd.

(57) ABSTRACT

The present invention relates to silane crosslinking catalyst comprising: —75 to 85 wt.-% of an olefin acrylate interpolymer and—15 to 25 wt.-% of a hindered amine light stabilizer (HALS) having a number average molecular weight Mn of 1500 to 4000 g/mol; and—optionally up to 5 wt.-% wax, wherein the silane crosslinking catalyst is free of tin, carboxylic acid(s) and sulphonic acid(s), all weight percentages with respect to the total weight of the silane crosslinking catalyst.

4 Claims, No Drawings

(56) References Cited

U.S. PATENT DOCUMENTS

| | | |
|---|---|---|
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2016/0347943 A1 | 12/2016 | Wang et al. |
| 2016/0347944 A1 | 12/2016 | Wang et al. |
| 2017/0009068 A1 | 1/2017 | Kahlen et al. |
| 2017/0029980 A1 | 2/2017 | Wang et al. |
| 2017/0137617 A1 | 5/2017 | Wang et al. |
| 2017/0166711 A1 | 6/2017 | Boragno et al. |
| 2017/0218172 A1 | 8/2017 | Wang et al. |
| 2017/0313867 A1 | 11/2017 | Lampela et al. |
| 2017/0321048 A1 | 11/2017 | Nummila-Pakarinen et al. |
| 2018/0079875 A1 | 3/2018 | Braun et al. |
| 2018/0163024 A1 | 6/2018 | Gopalan et al. |
| 2018/0163901 A1 | 6/2018 | Gopalan et al. |
| 2018/0194881 A1 | 7/2018 | Denifl et al. |
| 2020/0263015 A1 | 8/2020 | Kniesel et al. |
| 2020/0270434 A1 | 8/2020 | Van Houcke et al. |
| 2020/0277479 A1 | 9/2020 | Jerabek et al. |
| 2020/0308353 A1 | 10/2020 | Jerabek et al. |
| 2020/0347216 A1 | 11/2020 | Kniesel et al. |
| 2020/0392321 A1 | 12/2020 | Gahleitner et al. |
| 2021/0114352 A1 | 4/2021 | Oderkerk et al. |
| 2021/0269560 A1 | 9/2021 | Krallis et al. |

FOREIGN PATENT DOCUMENTS

| | | | |
|---|---|---|---|
| CN | 102719077 A | * 10/2012 | ............ B29C 48/92 |
| CN | 103724759 A | 4/2014 | |
| DE | 102008025575 A1 | 12/2009 | |
| EA | 014612 B1 | 12/2010 | |
| EP | 2 221 328 B1 | 4/2017 | |
| JP | H05-32850 A | 2/1993 | |
| JP | H09-95590 A | 4/1997 | |
| RU | 2381240 C2 | 2/2010 | |
| RU | 2415890 C1 | 4/2011 | |
| RU | 2450040 C2 | 5/2012 | |
| RU | 2478655 C2 | 4/2013 | |
| RU | 2481363 C2 | 5/2013 | |
| RU | 2516544 C2 | 5/2014 | |
| RU | 2625122 C2 | 7/2017 | |
| WO | WO 95/17463 A1 | 6/1995 | |
| WO | WO 2006/131263 A1 | 12/2006 | |
| WO | WO 2009/021050 A2 | 2/2009 | |
| WO | WO 2010/136373 A1 | 12/2010 | |
| WO | WO 2016/004204 A1 | 1/2016 | |

OTHER PUBLICATIONS

European Patent Office, Written Opinion in International Application No. PCT/EP2019/075979 (dated Nov. 5, 2019).

European Patent Office, International Preliminary Report on Patentability in International Application No. PCT/EP2019/075979 (dated Jun. 26, 2020).

Canadian Intellectual Property Office, Office Action in Canadian Patent Application No. 3,112,874 (dated Apr. 23, 2021).

Palmlöf et al., "Crosslinking reactions of ethylene vinyl silane copolymers at processing termperatures," *Journal of Applied Polymer Science* 42(5): 1193-1203 (1991).

Yao et al., "Research Progress on Catalysts for Silane Crosslinked Polyethylene," *Shanghai Plastics* Issue 03 (2015).

The State Intellectual Property Office of the People's Republic of China, First Office Action in Chinese Patent Application No. 201980059658.0 (dated Sep. 10, 2021).

Kolesnikov, *Catalysis in the gas and oil industry, Theory and Practice*, Textbook, Moscow: Publishing House, 2012 (Extract of 2nd paragraph in the left column on p. 5).

Federal Institute of Industrial Property (FIPS), Office Action in Russian Patent Application No. 2021110070/04 (dated Oct. 22, 2021).

\* cited by examiner

LOW SPEED CROSS-LINKING CATALYST FOR SILANE-GRAFTED PLASTOMERS

CROSS-REFERENCE TO RELATED APPLICATIONS

This patent application is the U.S. national phase of International Application No. PCT/EP2019/075979, filed on Sep. 26, 2019, which claims the benefit of European Patent Application No. 18198382.6, filed Oct. 2, 2018, the disclosures of which are incorporated herein by reference in their entireties for all purposes.

FIELD OF THE INVENTION

The present invention is concerned with silane crosslinking catalysts for crosslinking grafted plastomers to be used as EPDM replacements.

BACKGROUND OF THE INVENTION

EPDM is mostly used rubber in sealing applications. Generally speaking, EPDM is a very versatile material. However, the handling and processing of EPDM requires many steps and is labour and energy intensive process. This is one reason why there is interest for polyolefin based rubbery materials. Soft, cross-linkable polymers can indeed be used in many applications instead of EPDM or other classical rubbers. Immediate applications for those polyolefins based rubbery materials can be found on the automotive and building industry. The relatively complex production process of EPDM is also very challenging for guaranteeing absence of production related variations.

One way of controlling the properties of polyolefin-derived plastomers is to graft polyolefins with silanes in a first step and cross-link the grafted products using a condensation catalyst in a second step. In the second step, the silane-grafted polymer is subjected to a silanol forming condensation catalyst and then exposed to humidity and/or heat to effect crosslinking. The crosslinking then takes place via formation of backbone-Si—O—Si-backbone' bonds. The provision of the grafted plastomer is a two-step process; i.e. the plastomer is polymerised first and grafted in a second processing step.

In automotive applications, the required extreme reliability in very long term asks for decreased process related variation. This is particularly true for all fluid transfer systems, i.e. usually hoses in automotive applications. In addition to that, there is an increasing demand in the automotive field for low weight components, including also low weight fluid transfer systems, such as low weight hoses.

Moreover, silane crosslinking catalysts as known in the art suffer from the opportunities of controlling reaction rate upon the industrial needs. For example, car manufactures ask for crosslinking catalysts that allow very low curing speeds at room temperatures for 2 or even 4 days but allow achieving full curing within a maximum of 20 minutes at 140° C. or full curing within 10 minutes at similar temperature at elevated pressure. It is the object of the present invention to address these needs.

SUMMARY OF THE INVENTION

The present invention is based on the finding that excellent EPDM replacement is possible by grafting a polyolefin with alkoxy silane groups and crosslinking the grafted intermediate with a specific catalyst. The present invention is further based on the finding that the needs for controlling the crosslinking reaction rates can be met by a specific crosslinking catalyst.

The present invention insofar provides a silane crosslinking catalyst comprising
75 to 85 wt.-% of an olefin acrylate interpolymer and
15 to 25 wt.-% of a hindered amine light stabilizer (HALS) having a number average molecular weight Mn of 1500 to 4000 g/mol; and
optionally up to 5 wt.-% wax,
wherein the silane crosslinking catalyst is free of tin, carboxylic acid(s) and sulphonic acid(s),
all weight percentages with respect to the total weight of the silane crosslinking catalyst.

The present invention further provides
a crosslinkable formulation comprising
(1) a grafted ethylene alpha olefin plastomer comprising silane crosslinker in an amount of 1.0 to 10.0 wt.-% with respect to the grafted ethylene alpha olefin plastomer, wherein the grafted ethylene alpha olefin plastomer is obtained by
grafting an ethylene alpha olefin plastomer
and/or
grafting a plastomer having a density of from 850 kg/m$^3$ to 870 kg/m$^3$
and/or
grafting a plastomer having an melt flow rate (ISO 1133, 2.16 kg, 190° C.) of 0.40 to 1.5 g/10 min
(2) and a silane crosslinking catalysts comprising
75 to 85 wt.-% of an olefin acrylate interpolymer and
15 to 25 wt.-% of a hindered amine light stabilizer (HALS) having a number average molecular weight Mn of 1500 to 4000 g/mol; and
optionally up to 5 wt.-% wax, wherein the silane crosslinking catalyst is free of tin, carboxylic acid(s) and sulphonic acid(s),
all weight percentages with respect to the total weight of the silane crosslinking catalyst.

In a further aspect, the present invention provides
a process of crosslinking an ethylene alpha olefin plastomer, the process comprising the steps of
(a) providing an ethylene alpha olefin plastomer having one or more of the following characteristics:
being an ethylene octene plastomer;
having a density of from 850 kg/m$^3$ to 870 kg/m$^3$;
having an melt flow rate (ISO 1133, 2.16 kg, 190° C.) of 0.40 to 1.5 g/10 min;
(b) grafting the ethylene alpha olefin plastomer and thereby providing a grafted ethylene alpha olefin plastomer such that the content of silane cross-linker is in an amount of 0.1 to 10.0 wt.-% with respect to the grafted ethylene alpha olefin plastomer;
(c) contacting said grafted ethylene alpha olefin plastomer with a silane crosslinking catalyst comprising
75 to 85 wt.-% of an olefin acrylate interpolymer and
15 to 25 wt.-% of a hindered amine light stabilizer (HALS) having a number average molecular weight Mn of 1500 to 4000 g/mol; and
optionally up to 5 wt.-% wax, wherein the silane crosslinking catalyst is free of tin, carboxylic acid and sulphonic acid;
all weight percentages with respect to the total weight of the silane crosslinking catalyst
at a temperature sufficient for at least partial crosslinking, thereby providing an at least partially crosslinked ethylene alpha olefin plastomer.

In yet a further aspect, the present invention provides a process for providing a fluids transport product comprising the steps of
(a) providing a grafted ethylene alpha olefin plastomer having a content of silane crosslinker of 0.1 to 10.0 wt.-% with respect to the grafted ethylene alpha olefin plastomer;
(b) extruding said grafted ethylene alpha olefin plastomer into a tubular structure
in the presence of a silane crosslinking catalyst comprising
75 to 85 wt.-% of an olefin acrylate interpolymer and
15 to 25 wt.-% of a hindered amine light stabilizer (HALS) having a number average molecular weight Mn of 1500 to 4000 g/mol; and
optionally up to 5 wt.-% wax, wherein the silane crosslinking catalyst is free of tin, carboxylic acid and sulphonic acid,
all weight percentages with respect to the total weight of the silane crosslinking catalyst;
(c) optionally reinforcing the tubular structure by fabric and further optionally covering the fabric with the same or a different grafted ethylene alpha olefin plastomer also having a content silane crosslinker of 0.1 to 10.0 wt.-%;
(d) optionally labelling the outer surface;
(e) optionally fixing the labelling if present by using UV rays;
(f) washing the structure obtained;
(g) cutting the structure into semi-finished products
(h) maintaining the semi-finished products at a temperature of from 10 to 25° C. and relative humidity of from up to 60%;
(i) placing the semi-finished products on shaped mandrels;
(j) subjecting the semi-finished products placed on the shaped mandrels to curing by increasing temperature and optionally increasing pressure, and further optionally increasing relative humidity thereby obtaining cured semi-finished fluids transport products having a predetermined shape;
(k) optionally washing and further optionally trimming the cured semi finished fluids transport products to yield the fluids transport products.

A silane crosslinking catalyst is a catalyst promoting the hydrolysis of the silicium alkoxy groups to silicium hydroxyl groups and subsequently the formation of intermolecular, irreversible Si—O—Si crosslink sites.

Olefin acrylate interpolymer stands for ethylene acrylate copolymer, ethylene acrylate terpolymer, ethylene acrylate quaterpolymer, i.e. a polymer containing units derived from ethylene and acrylate containing olefin(s), whereby the number of different acrylate containing olefin(s) can be higher than 1.

Wax denotes an organic compound that melts within the temperature range of 35° C. to 65° C. without deterioration.

Butylated reaction products of p-cresol and dicyclopentadiene are well known in the art and are frequently used as antioxidants for rubber products.

Ethylene-α-Olefin Plastomer

Plastomer denotes a polymer material that combines qualities of elastomers and plastics.

The optional ethylene-α-olefin plastomer may have a density in the range of from 860 to 900 kg/m$^3$, preferably in the range of from 865 to 895 kg/m$^3$ and more preferably in the range of from 870 to 890 kg/m$^3$.

The MFR2 (190° C./2.16 kg) measured according to ISO 1133 of the optional ethylene-α-olefin plastomer is in the range of from 0.5 to 50.0 g/10 min, preferably in the range of from 0.8 to 45.0 g/10 min and more preferably in the range of from 1.0 to 35.0 g/10 min.

Suitable ethylene-based plastomers may have an ethylene content from 60.0 to 95.0 wt %, preferably from 65.0 to 90.0 wt % and more preferably from 70.0 to 88.0 wt %. The comonomer contribution preferably is up to 40.0 wt %, more preferably up to 35.0 wt %. The comonomer contents of conventional ethylene plastomers are familiar to the person skilled in the art.

The ethylene-based plastomer may be a copolymer of ethylene and propylene or a C4-C10 alpha-olefin. Suitable C4-C10 alpha-olefins include 1-butene, 1-hexene and 1-octene, preferably 1-butene or 1-octene and more preferably 1-octene. Preferably, copolymers of ethylene and 1-octene are used.

The melting points (measured with DSC according to ISO 11357-3:1999) of suitable ethylene based plastomers can be below 130° C., preferably below 120° C., more preferably below 110° C. and most preferably below 100° C. A reasonable lower limit for the melting points of suitable ethylene based plastomers may be 30° C. A typical melting point range is from 33 to 115° C.

Furthermore suitable ethylene based plastomers may have a glass transition temperature Tg (measured by DMTA according to ISO 6721-7) of below −40° C., preferably below −54° C., more preferably below −58° C.

The Mw/Mn value of the ethylene based plastomer, representing the broadness of the molecular weight distribution (MWD), is preferably in the range of from 1.5 to 5.0, more preferably in the range of from 2.0 to 4.5, even more preferably in the range of from 2.5 to 4.0.

The ethylene-based plastomer can be unimodal or multimodal, preferably unimodal. 25

Preferably, the PE plastomer is a metallocene catalysed polymer although Ziegler-Natta based polyethylene plastomers are also possible.

Suitable ethylene based plastomers can be any copolymer of ethylene and propylene or ethylene and C4-C10 alpha olefin having the above defined properties, which are commercial available, i.e. from *Borealis* AG (AT) under the tradename Queo, from DOW Chemical Corp (USA) under the tradename Engage or Affinity, or from Mitsui under the tradename Tafmer.

Alternatively, the ethylene based plastomer can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably, these ethylene-based plastomers are prepared by a one stage or two-stage solution polymerization process, especially by high temperature solution polymerization process at temperatures higher than 100° C.

Such processes are essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably, the solution polymerization process is a high temperature solution polymerization process, using a polymerization temperature of higher than 100° C. Preferably, the polymerization temperature is at least 110°, more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a C5-12-hydrocarbon which may be unsubstituted or substituted by a C1-4 alkyl group such as pentane, methyl pentane, hexane, heptane, octane, cyclohexane, methylcyclohexane and hydrogenated naphta. More preferably, unsubstituted C6-10-hydrocarbon solvents are used.

Fluids transport product denotes any article being suitable for transporting fluids.

Hose denotes a flexible tube for conveying a liquid or a gas. In contrast to pipes, hoses show flexibility during conventional use conditions.

Fluid transport products denotes fluid transport products other than hoses such as fittings or pipes.

The present invention allows adaptation of the crosslinking rates according to the industrial need of the final applications. In other words, the silane crosslinking catalysts according to the present invention are extremely versatile and can particularly promote both very low curing speed at room temperature and high curing speed when high temperature, maybe further combined with water bath are applied.

The final articles, particularly hoses and fluid transfer systems also qualify by good surface finish, shore A hardness, compression set, tear strength and long-term heat aging even at elevated temperatures of ~175° C.

Silane Crosslinker

A silane crosslinker can be used to covalently graft silane moieties onto the first and 15 second polyolefins and the silane crosslinker may include alkoxysilanes, silazanes, siloxanes, or a combination thereof. The grafting and/or coupling of the various potential silane crosslinkers or silane crosslinker molecules is facilitated by the reactive species formed by the grafting initiator reacting with the respective silane crosslinker.

In some aspects, the silane crosslinker is a silazane where the silazane may include, for example, hexamethyldisilazane (HMDS) or Bis(trimethylsilyl)amine. In some aspects, the silane crosslinker is a siloxane where the siloxane may include, for example, polydimethylsiloxane (PDMS) and octamethylcyclotetrasiloxane.

In some aspects, the silane crosslinker is an alkoxysilane. As used herein, the term "alkoxysilane" refers to a compound that comprises a silicon atom, at least one alkoxy group and at least one other organic group, wherein the silicon atom is bonded with the organic group by a covalent bond. Preferably, the alkoxysilane is selected from alkylsilanes; acryl-based silanes; vinyl-based silanes; aromatic silanes; epoxy-based silanes; amino-based silanes and amines that possess —NH2, —NHCH3 or —N(CH3)2; ureide-based silanes; mercapto-based silanes; and alkoxysilanes which have a hydroxyl group (i.e., —OH). An acryl-based silane may be selected from the group comprising beta-acryloxyethyl trimethoxysilane; beta-acryloxy propyl trimethoxysilane; gamma-acryloxyethyl trimethoxysilane; gamma-acryloxypropyl trimethoxysilane; beta-acryloxyethyl triethoxysilane; beta-acryloxypropyl triethoxysilane; gamma-acryloxyethyl triethoxysilane; gamma-acryloxypropyl triethoxysilane; beta-methacryloxyethyl trimethoxysilane; beta-methacryloxypropyl trimethoxysilane; gamma-methacryloxyethyl trimethoxysilane; gamma-methacryloxypropyl trimethoxysilane; beta-methacryloxyethyl triethoxysilane; beta-methacryloxypropyl triethoxysilane; gamma-methacryloxyethyl triethoxysilane; gamma-methacryloxypropyl triethoxysilane; 3-methacryloxypropylmethyl diethoxysilane. A vinyl-based silane may be selected from the group comprising vinyl trimethoxysilane; vinyl triethoxysilane; p-styryl trimethoxysilane, methylvinyldimethoxysilane, vinyldimethylmethoxysilane, divinyldimethoxysilane, vinyltris(2-methoxyethoxy)silane, and vinylbenzylethylenediaminopropyltrimethoxysilane. An aromatic silane may be selected from phenyltrimethoxysilane and phenyltriethoxysilane. An epoxy-based silane may be selected from the group comprising 3-glycydoxypropyl trimethoxysilane; 3-glycydoxypropylmethyl diethoxysilane; 3-glycydoxypropyl triethoxysilane; 2-(3,4-epoxycyclohexyl)ethyl trimethoxysilane, and glycidyloxypropylmethyldimethoxysilane. An amino-based silane may be selected from the group comprising 3-aminopropyl triethoxysilane; 3-aminopropyl trimethoxysilane; 3-aminopropyldimethyl ethoxysilane; 3-aminopropylmethyldiethoxysilane; 4-aminobutyltriethoxysilane; 3-aminopropyldiisopropyl ethoxysilane; 1-amino-2-(dimethylethoxysilyl)propane; (aminoethylamino)-3-isobutyldimethyl methoxysilane; N-(2-aminoethyl)-3-aminoisobutylmethyl dimethoxysilane; (aminoethylaminomethyl)phenetyl trimethoxysilane; N-(2-aminoethyl)-3-aminopropylmethyl dimethoxysilane; N-(2-aminoethyl)-3-aminopropyl trimethoxysilane; N-(2-aminoethyl)-3-aminopropyl triethoxysilane; N-(6-aminohexyl) aminomethyl trimethoxysilane; N-(6-aminohexyl) aminomethyl trimethoxysilane; N-(6-aminohexyl) aminopropyl trimethoxysilane; N-(2-aminoethyl)-1,1-aminoundecyl trimethoxysilane; 1,1-aminoundecyl triethoxysilane; 3-(m-aminophenoxy)propyl trimethoxysilane; m-aminophenyl trimethoxysilane; p-aminophenyl trimethoxysilane; (3-trimethoxysilylpropyl)diethylenetriamine; N-methylaminopropylmethyl dimethoxysilane; N-methylaminopropyl trimethoxysilane; dimethylaminomethyl ethoxysilane; (N,N-dimethylaminopropyl)trimethoxysilane; (N-acetylglycyl)-3-aminopropyl trimethoxysilane, N-phenyl-3-aminopropyltrimethoxysilane, N-phenyl-3-aminopropyltriethoxysilane, phenylaminopropyltrimethoxysilane, aminoethylaminopropyltrimethoxysilane, and aminoethylaminopropylmethyldimethoxysilane. An ureide-based silane may be 3-ureidepropyl triethoxysilane. A mercapto-based silane may be selected from the group comprising 3-mercaptopropylmethyl dimethoxysilane, 3-mercaptopropyl trimethoxysilane, and 3-mercaptopropyl triethoxysilane. An alkoxysilane having a hydroxyl group may be selected from the group comprising hydroxymethyl triethoxysilane; N-(hydroxyethyl)-N-methylaminopropyl trimethoxysilane; bis(2-hydroxyethyl)-3-aminopropyl triethoxysilane; N-(3-triethoxysilylpropyl)-4-hydroxy butylamide; 1,1-(triethoxysilyl)undecanol; triethoxysilyl undecanol; ethylene glycol acetal; and N-(3-ethoxysilylpropyl)gluconamide.

In some aspects, the alkylsilane may be expressed with a general formula: RnSi(OR')4-n wherein: n is 1, 2 or 3; R is a C1-20 alkyl or a C2-20 alkenyl; and R' is an C1-20 alkyl. The term "alkyl" by itself or as part of another substituent, refers to a straight, branched or cyclic saturated hydrocarbon group joined by single carbon-carbon bonds having 1 to 20 carbon atoms, for example 1 to 10 carbon atoms, for example 1 to 8 carbon atoms, preferably 1 to 6 carbon atoms. When a subscript is used herein following a carbon atom, the subscript refers to the number of carbon atoms that the named group may contain. Thus, for example, C1-6 alkyl means an alkyl of one to six carbon atoms. Examples of alkyl groups are methyl, ethyl, propyl, isopropyl, butyl, isobutyl, sec-butyl, t-butyl, 2-methylbutyl, pentyl, iso-amyl and its isomers, hexyl and its isomers, heptyl and its isomers, octyl and its isomer, decyl and its isomer, dodecyl and its isomers. The term "C2-20 alkenyl" by itself or as part of another substituent, refers to an unsaturated hydrocarbyl group, which may be linear, or branched, comprising one or more carbon-carbon double bonds having 2 to 20 carbon atoms. Examples of C2-6 alkenyl groups are ethenyl, 2-propenyl, 2-butenyl, 3-butenyl, 2-pentenyl and its isomers, 2-hexenyl and its isomers, 2,4-pentadienyl and the like.

In some aspects, the alkylsilane may be selected from the group comprising methyltrimethoxysilane; methyltriethoxysilane; ethyltrimethoxysilane; ethyltriethoxysilane; propyltrimethoxysilane; propyltriethoxysilane; hexyltrimethoxysilane; hexyltriethoxysilane; octyltrimethoxysilane; octyltriethoxysilane; decyltrimethoxysilane; decyltriethoxysilane; dodecyltrimethoxysilane: dodecyltriethoxysilane; tridecyltrimethoxysilane; dodecyltriethoxysilane; hexadecyltrimethoxysilane; hexadecyltriethoxysilane; octadecyltrimethoxysilane; octadecyltriethoxysilane, trimethylmethoxysilane, methylhydrodimethoxysilane, dimethyldimethoxysilane, diisopropyldimethoxysilane, diisobutyldimethoxysilane, isobutyltrimethoxysilane, n-butyltrimethoxysilane, n-butylmethyldimethoxysilane, phenyltrimethoxysilane, phenyltrimethoxysilane, phenylmethyldimethoxysilane, triphenylsilanol, n-hexyltrimethoxysilane, n-octyltrimethoxysilane, isooctyltrimethoxysilane, decyltrimethoxysilane, hexadecyltrimethoxysilane, cyclohexylmethyldimethoxysilane, cyclohexylethyldimethoxysilane, dicyclopentyldimethoxysilane, tert-butylethyldimethoxysilane, tert-butylpropyldimethoxysilane, dicyclohexyldimethoxysilane, and a combination thereof.

In some aspects, the alkylsilane compound may be selected from triethoxyoctylsilane, trimethoxyoctylsilane, and a combination thereof.

Additional examples of silanes that can be used as silane crosslinkers include, but are not limited to, those of the general formula CH2=CR—(COO)x(CnH2n)ySiR'3, wherein R is a hydrogen atom or methyl group; x is 0 or 1; y is 0 or 1; n is an integer from 1 to 12; each R' can be an organic group and may be independently selected from an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (e.g., alkylamino, arylamino), or a lower alkyl group having 1 to 6 carbon atoms. x and y may both equal 1. In some aspects, no more than one of the three R' groups is an alkyl. In other aspects, not more than two of the three R' groups is an alkyl.

Any silane or mixture of silanes known in the art that can effectively graft to and crosslink an olefin polymer can be used in the practice of the present disclosure. In some aspects, the silane crosslinker can include, but is not limited to, unsaturated silanes which include an ethylenically unsaturated hydrocarbyl group (e.g., a vinyl, allyl, isopropenyl, butenyl, cyclohexenyl or a gamma-(meth)acryloxy allyl group) and a hydrolyzable group (e.g., a hydrocarbyloxy, hydrocarbonyloxy, or hydrocarbylamino group). Non-limiting examples of hydrolyzable groups include, but are not limited to, methoxy, ethoxy, formyloxy, acetoxy, proprionyloxy, and alkyl, or arylamino groups.

In other aspects, the silane crosslinkers are unsaturated alkoxy silanes which can be grafted onto the polymer. In still other aspects, additional exemplary silane crosslinkers include vinyltrimethoxysilane, vinyltriethoxysilane, 3-(trimethoxysilyl)propyl methacrylate gamma-(meth)acryloxypropyl trimethoxysilane), and mixtures thereof.

The silane crosslinker may be present in the silane-grafted polyolefin elastomer in an amount of from greater than 0.1 wt % to about 10 wt %, including from about 0.5 wt % to about 5 wt %. The amount of silane crosslinker may be varied based on the nature of the olefin polymer, the silane itself, the processing conditions, the grafting efficiency, the application, and other factors. In still other aspects, the silane crosslinker content is at least 1% based on the weight of the reactive composition.

Cross-Linking Catalyst

The crosslinking catalyst according to the present invention preferably contains 80 to 84 wt.-% olefin acrylate interpolymer.

The crosslinking catalyst according to the present invention may preferably contain the hindered amine light stabilizer (HALS) in an amount of 15 to 20 wt.-%.

The hindered amine light stabilizer (HALS) may be a single hindered amine light stabilizer (HALS) component or a mixture of two or more hindered amine light stabilizers (HALS) components.

The amount of optional wax in the silane crosslinking catalyst according to the present invention is preferably from 0.5 to 2.0 wt.-%.

The hindered amine light stabilizer (HALS) preferably has a number average molecular weight Mn in the range of 2000 to 3100 g/mol. Such hindered amine light stabilizers are commercially available. As an example, attention is drawn to Chimassorb 944.

The olefin acrylate interpolymer according to the present invention is preferably selected from the group of ethylene butyl acrylate (EBA), ethylene ethyl acrylate (EEA) and ethyl methyl acrylate (EMA). Ethylene butyl acrylate (EBA) is particularly preferred. As a matter of definition olefin acrylate interpolymer also includes mixtures thereof.

Moreover, the olefin acrylate interpolymer according to the present invention preferably has a MFR (2.16 kg, ISO1133) of 3.0 to 15 g/10 min.

The hindered amine light stabilizer (HALS) as contained in the silane crosslinking catalyst according to the present invention preferably has a melting temperature of at least 95° C., more preferably from 100 to 135° C.

In yet a further aspect, the wax is more preferably present in an amount of 0.5 to 1.4 wt.-% with respect to the total weight of the silane crosslinking catalyst.

The silane crosslinking catalyst according to the present invention preferably does not contain a butylated reaction product of p-cresol and dicyclopentadiene. Such antioxidants have a tendency not to properly disperse.

In yet a further aspect, the silane crosslinking catalyst according to the present invention preferably shall not contain an alkylalkoxysilane, particularly shall not contain alkyalkoxysilane such as for example hexadecyltrimethoxysilane.

In the silane crosslinking catalyst according to the present invention the olefin acrylate interpolymer preferably is ethylene butyl acrylate (EBA) having a content of butylate groups O—$CH_2$—$CH_2$—$CH_2$—$CH_3$ of 15 to 20 wt.-% with respect to the total ethylene butyl acrylate (EBA). Most preferably EBA is the only acrylate being present.

As mentioned above olefin acrylate interpolymer according to the present invention preferably has a MFR (2.16 kg, ISO1133, 190° C.) of 3.0 to 15 g/10 min, more preferably 5.0 to 10.0 g/10 min (ISO1133, 2.16 kg load, 190° C.).

The present invention is further concerned with a crosslinkable formulation comprising the silane crosslinking catalysts as described above. All preferred aspects as described herein with respect to the silane crosslinking catalysts shall also hold for the crosslinkable formulation comprising the silane crosslinking catalysts.

Particularly the present invention is concerned with a formulation comprising
(1) a grafted ethylene alpha olefin plastomer containing silane cross-linker in an amount of 0.1 to 10.0 wt.-% with respect to the grafted ethylene alpha olefin plastomer, wherein the grafted ethylene alpha olefin plastomer is obtained by
grafting an ethylene octene plastomer
and/or
grafting a plastomer having a density of from 850 kg/m$^3$ to 870 kg/m$^3$
and/or
grafting a plastomer having an melt flow rate (ISO 1133, 2.16 kg, 190° C.) of 0.40 to 1.5 g/10 min; and
(2) a silane crosslinking catalysts comprising
75 to 85 wt.-% of an olefin acrylate interpolymer and
15 to 25 wt.-% of a hindered amine light stabilizer (HALS) having a number average molecular weight Mn of 1500 to 4000 g/mol; and
optionally up to 5 wt.-% wax, wherein the silane crosslinking catalyst is free of tin, carboxylic acid(s) and sulphonic acid(s),
all weight percentages with respect to the total weight of the silane crosslinking catalyst.

In a preferred aspect, the grafted ethylene alpha olefin plastomer is preferably obtained by grafting an ethylene octene plastomer having a density of from 850 kg/m$^3$ to 870 kg/m$^3$ and further having an melt flow rate (ISO 1133, 2.16 kg, 190° C.) of 0.40 to 1.5 g/10 min.

The grafted ethylene alpha olefin plastomer preferably contains silane crosslinker in an amount of 1.4 to 2.3 wt.-% with respect to the grafted ethylene alpha olefin plastomer.

Suitable ethylene alpha olefin plastomers to be used as reactants in the grafting step are commercially available and well known in the art.

In yet a further aspect, the present invention provides a process of crosslinking an ethylene alpha olefin plastomer, the process comprising the steps of
(a) providing an ethylene alpha olefin plastomer having one or more of the following characteristics:
being an ethylene octene plastomer;
having a density of from 850 kg/m$^3$ to 870 kg/m$^3$;
having an melt flow rate (ISO 1133, 2.16 kg, 190° C.) of 0.40 to 1.5 g/10 min;
(b) grafting the ethylene alpha olefin plastomer and thereby providing a grafted ethylene alpha olefin plastomer such that the content of silane crosslinker is in an amount of 0.1 to 10 wt.-% with respect to the grafted ethylene alpha olefin plastomer;
(c) contacting said grafted ethylene alpha olefin plastomer with a silane crosslinking catalyst comprising
75 to 85 wt.-% of an olefin acrylate interpolymer and
15 to 25 wt.-% of a hindered amine light stabilizer (HALS) having a number average molecular weight Mn of 1500 to 4000 g/mol; and
optionally up to 5 wt.-% wax, wherein the silane crosslinking catalyst is free of tin, carboxylic acid and sulphonic acid;
all weight percentages with respect to the total weight of the silane crosslinking catalyst
at a temperature sufficient for at least partial crosslinking, thereby providing an at least partially crosslinked ethylene alpha olefin plastomer.

All preferred ranges and aspects as disclosed for the silane crosslinking catalyst or the plastomer shall also hold for the process.

In yet a further embodiment, the present invention provides a process for providing a fluids transport product comprising the steps of
(a) providing a grafted ethylene alpha olefin plastomer having a content of silane crosslinker of 0.1 to 10 wt.-% with respect to the grafted ethylene alpha olefin plastomer;
(b) extruding said grafted ethylene alpha olefin plastomer into a tubular structure
in the presence of a silane crosslinking catalyst comprising
75 to 85 wt.-% of an olefin acrylate interpolymer and
15 to 25 wt.-% of a hindered amine light stabilizer (HALS) having a number average molecular weight Mn of 1500 to 4000 g/mol; and
optionally up to 5 wt.-% wax, wherein the silane crosslinking catalyst is free of tin, carboxylic acid and sulphonic acid,
all weight percentages with respect to the total weight of the silane crosslinking catalyst;
(c) optionally reinforcing the tubular structure by fabric and further optionally covering the fabric with the same or a different grafted ethylene alpha olefin plastomer also having a content of silane crosslinker of 0.1 to 10 wt.-%;
(d) optionally labelling the outer surface;
(e) optionally fixing the labelling if present by using UV rays;
(f) washing the structure obtained;
(g) cutting the structure into semi-finished products
(h) maintaining the semi-finished products at a temperature of from 10 to 25° C. and relative humidity of from up to 60%;
(i) placing the semi-finished products on shaped mandrels;
(j) subjecting the semi-finished products placed on the shaped mandrels to curing by increasing temperature and optionally increasing pressure, and further optionally increasing relative humidity thereby obtaining cured semi-finished fluids transport products having a predetermined shape;
(k) optionally washing and further optionally trimming the cured semi finished fluids transport products to yield the fluids transport products.

Preferably, the semi-finished products are maintained at a temperature of from 10 to 25° C. and at a relative humidity of up to 60% [step (h)]. More preferably, the relative humidity during step (h) is less than 55%. More preferably and independent therefrom, step (h) lasts for at least 24 h. Usually step (h) will not last longer than 100 hours. Step (h) and particularly its relatively long duration provides excellent flexibility for industrial processes.

The fluid transport product of the process described above is preferably a hose. In a further embodiment, the present invention is also concerned with a fluid transport product or hose as obtained by the process described herein. The specific process features including also the inventive catalyst guarantee a combination of properties. Particularly the fluid transport product or hose as obtained by the process described herein can easily meet shore hardness A, good compression set, tear strength and long-term heat aging as well as low weight.

In yet a further embodiment, the present invention concerns vehicles comprising a fluid transport product or hose as described herein. The inventive low weight materials contribute significantly to the weight savings versus standard materials such as EPDM.

The present invention is further concerned with crosslinkable formulations
(1) a grafted ethylene alpha olefin plastomer containing silane crosslinker in an amount of 0.1 to 10 wt.-% with respect to the grafted ethylene alpha olefin plastomer, wherein the grafted ethylene alpha olefin plastomer is obtained by
grafting an ethylene octene plastomer
and/or
grafting a plastomer having a density of from 850 kg/m$^3$ to 870 kg/m$^3$
and/or
grafting a plastomer having an melt flow rate (ISO 1133, 2.16 kg, 190° C.) of 0.40 to 1.5 g/10 min; and
(2) a silane crosslinking catalysts comprising
75 to 85 wt.-% of an olefin acrylate interpolymer and
15 to 25 wt.-% of a hindered amine light stabilizer (HALS) having a number average molecular weight Mn of 1500 to 4000 g/mol; and
optionally up to 5 wt.-% wax, wherein the silane crosslinking catalyst is free of tin, carboxylic acid(s) and sulphonic acid(s),
all weight percentages with respect to the total weight of the silane crosslinking catalyst for replacing EPDM.

Such use is preferably characterized by the lower weight of the articles versus the same articles made from EPDM.

The preparation of fluid transport products, preferably hoses is per se known in the art. A preferred process for the preparation of hoses is described in WO2016004204 inter alia at paragraphs [0089] to [0093] which are incorporated by reference herewith. WO2016004204 further describes optional basic layouts for hoses inter alia in paragraphs [0026] to [0039] which are incorporated by reference herewith.

In the following, several particularly preferred embodiments shall be described.

In a first particularly preferred embodiment, the silane crosslinking catalyst according to the present invention comprises
75 to 85 wt.-% of an olefin acrylate interpolymer having an MFR (2.16 kg load, ISO1133) of 5 to 15 g/10 min wherein the olefin acrylate interpolymer is selected from the group of ethylene butyl acrylate (EBA), ethylene ethyl acrylate (EEA) and ethyl methyl acrylate (EMA) and
15 to 25 wt.-% of a hindered amine light stabilizer (HALS) having a number average molecular weight Mn of 1500 to 4000 g/mol and having a melting temperature of at least 95° C.; and
optionally up to 5 wt.-% wax, wherein the silane crosslinking catalyst is free of tin, carboxylic acid(s) and sulphonic acid(s),
all weight percentages with respect to the total weight of the silane crosslinking catalyst.

In a second also particularly preferred embodiment the silane crosslinking catalyst according to the present invention comprises
75 to 85 wt.-% of an olefin acrylate interpolymer having an MFR (2.16 kg load, ISO1133) of 5 to 10 g/10 min wherein the olefin acrylate interpolymer is ethylene butyl acrylate (EBA) having a content of butylate groups O—CH$_2$—CH$_2$—CH$_2$—CH$_3$ of 15 to 20 wt.-% with respect to the total ethylene butyl acrylate (EBA),
and
15 to 25 wt.-% of a hindered amine light stabilizer (HALS) having a number average molecular weight Mn of 1500 to 4000 g/mol
and having a melting temperature of at least 95° C.; and
optionally up to 5 wt.-% wax, wherein the silane crosslinking catalyst is free of tin, carboxylic acid(s) and sulphonic acid(s),
all weight percentages with respect to the total weight of the silane crosslinking catalyst.

These particularly preferred embodiments may be combined with the preferred features and ranges as described above as far as appropriate.

Materials

Plastomers P1-P3 are ethylene octene copolymers.

Reference catalyst 1 (RC1) is Ambicat LE4476.

Reference catalyst 2 (RC2) is a sulphonic acid-based cross-linking catalyst.

Inventive catalyst 1 (IC1) comprises 83 wt % of EBA containing 17 wt % BA units, 1 wt % Licowax and 16 wt % Chimassorb 944.

Measurement Methods

Degree of Crosslinking (Gel Content):

Degree of crosslinking was measured by decaline extraction according to ASTM D 2765-01, Method A on the crosslinked material.

Sample Preparation

The sample preparation was done as following:

The tested plastomers were dry blended (mixed) with catalyst masterbatches and then extruded into tapes. Tape samples were produced on a Collin extruder (Teach-Line E20T) with a temperature profile of 120-130-140° C. The tape samples had a thickness of 2 mm and a width of 40 mm.

Cross-Linking

The samples were crosslinked in a conditioned room having 50% humidity at 23° C. for 24 h.

Results

EXAMPLE 1

The silane crosslinking catalysts RC1, RC2 and IC2 were tested on plastomers subjected to grafting. The used reactants are indicated in Table 1.

TABLE 1

Crosslinking degree of the inventive silane crosslinking catalyst IC1 (24 h, 48 h, 4 days)

| | Plastomer | | | | Gel content after crosslinking at RT | | |
|---|---|---|---|---|---|---|---|
| Name | MFR (g/10 min) | Density (kg/m$^3$) | VTMS % | IC1 | 24 h | 48 h | 4 days |
| P1 | 0.5 | 863 | 2.0 | 5% | 8% | 8% | 22% |
| P2 | 1 | 857 | 1.8 | 5% | 5% | 13% | 7% |
| P3 | 0.5 | 861 | 1.7 | 5% | 11% | 20% | 32% |

It can be seen the crosslinking degree remained on a surprisingly low level even for up to 4 days.

TABLE 2

Crosslinking degree of the reference silane crosslinking catalyst RC2 (24 h, 48 h, 4 days)

| Plastomer | | | | Gel content after crosslinking at RT | | |
|---|---|---|---|---|---|---|
| Name | MFR (g/10 min) | Density (kg/m³) | VTMS % | RC2 | 24 h | 48 h | 4 days |
| P1 | 0.5 | 863 | 2.0 | 5% | 96% | 96% | 96% |
| P2 | 1 | 857 | 1.8 | 5% | 96% | 96% | 96% |
| P3 | 0.5 | 861 | 1.7 | 5% | 96% | 96% | 96% |

TABLE 3

Crosslinking degree of the reference silane crosslinking catalyst RC1 (24 h, 48 h, 4 days)

| Plastomer | | | | Gel content after crosslinking at RT | | |
|---|---|---|---|---|---|---|
| Name | MFR (g/10 min) | Density (kg/m³) | VTMS % | RC1 | 24 h | 48 h | 4 days |
| P1 | 0.5 | 863 | 2.0 | 5% | 96% | 96% | 96% |
| P2 | 1 | 857 | 1.8 | 5% | 96% | 96% | 96% |
| P3 | 0.5 | 861 | 1.7 | 5% | 96% | 96% | 96% |

It can be seen the crosslinking degree could not be maintained at a low level e.g. for storage.

All tests were made on 2 mm extruded tapes using 95% plastomer (Engage and Queo) and 5% of a catalyst.

EXAMPLE 2

All tapes using IC1 (Table 1) after experimental treatment for 4 days were (as described above) were placed in a water bath using deionized water at 90° C. for 24 hours.

TABLE 4

Crosslinking degree of the inventive silane crosslinking catalyst IC1 after cross-linking in water bath.

| Plastomer | | | | Gel content after |
|---|---|---|---|---|
| Name | MFR (g/10 min) | Density (kg/m³) | VTMS % | IC1 | crosslinking at 90° C. for 24 h |
| P1 | 0.5 | 863 | 2.0 | 5% | >70% |
| P2 | 1 | 857 | 1.8 | 5% | >70% |
| P3 | 0.5 | 861 | 1.7 | 5% | >70% |

IE1 showed crosslinking of above 70% gel content, i.e. Cooper Standard specification (minimum 70% gel content) after 24 h was met.

The inventive silane crosslinking catalysts allows modifying reaction rates according to the industrial needs.

EXAMPLE 3

The production operation included an extrusion of a rubber like tube which is reinforced in another step by a fabric material.

Cooling and forming was effected under water thereby forming a hose. The hoses were cut to the required length providing semi-finished products. The semi-finished products were maintained at 23° C. and 55% relative humidity for 4 days.

After that the semi-finished products were placed on the shaped mandrels and subjected to curing (autoclave, 20 minute curing program consisting of 10 minutes at 140° C. at 3.6 bar and 10 min at 7.6 bar).

Then cured hoses were removed from the mandrels. Shape retention was observed.

Gel content was measured and was well above 70%.

It could be shown the silane crosslinking catalysts allows an extremely advantageous process for providing a fluids transport products.

The invention claimed is:

1. A silane crosslinking catalyst comprising
    75 to 85 wt.-% of an olefin acrylate interpolymer and 15 to 25 wt.-% of a hindered amine light stabilizer (HALS) having a number average molecular weight Mn of 1500 to 4000 g/mol; and
    optionally up to 5 wt.-% wax,
    wherein said olefin acrylate interpolymer is ethylene butyl acrylate copolymer (EBA) having a content of butyloxy group O—$CH_2$—$CH_2$—$CH_2$—$CH_3$ of 15 to 20 wt.-% with respect to the ethylene butyl acrylate copolymer (EBA), and/or a melt flow rate of 5.0 to 10.0 g/10 min (ISO1133, 2.16 kg load, 190° C.);
    wherein the silane crosslinking catalyst is free of tin, carboxylic acid(s), and sulphonic acid(s), and
    wherein all weight percentages are with respect to the total weight of the silane crosslinking catalyst.

2. The silane crosslinking catalyst according to claim 1, wherein
    the hindered amine light stabilizer (HALS) has a melting temperature of at least 95° C.; and/or
    the wax is present in an amount of 2.0 wt.-% or less with respect to the total weight of the silane crosslinking catalyst.

3. The silane crosslinking catalyst according to claim 1, wherein the silane crosslinking catalyst does not contain a butylated reaction product of p-cresol and dicyclopentadiene.

4. The silane crosslinking catalyst according to claim 1, wherein the silane crosslinking catalyst does not contain an alkoxysilane.

* * * * *